United States Patent

[11] 3,605,096

| [72] | Inventors | Reginald Allan Fothergill;<br>William Harold Sellek; Kenneth George Norman, all of Basingstoke, England |
|---|---|---|
| [21] | Appl. No. | 761,601 |
| [22] | Filed | Sept. 23, 1968 |
| [45] | Patented | Sept. 14, 1971 |
| [73] | Assignee | United Kingdom Atomic Energy Authority London, England |
| [32] | Priority | Oct. 3, 1967 |
| [33] |  | Great Britain |
| [31] |  | 45065/67 |

[54] NUCLEAR EXPLOSION DIRECTION INDICATOR
8 Claims, 3 Drawing Figs.

[52] U.S. Cl. .................................................... 343/113
[51] Int. Cl. .................................................... G01s 3/50
[50] Field of Search .......................................... 343/113, 112, 100

[56] References Cited
UNITED STATES PATENTS

| 2,637,841 | 5/1953 | Davis et al. | 343/112 X |
| 3,383,690 | 5/1968 | Keller | 343/113 |

OTHER REFERENCES

Dickinson et al., Proceedings of the IEEE, Vol. 53, No. 12, Dec. 1965, page 1927 relied on, copy in Scientific Library, TK5700.17

*Primary Examiner*—Rodney D. Bennett, Jr.
*Assistant Examiner*—Richard E. Berger
*Attorney*—Larson, Taylor and Hinds ABSTRACT: The indicator comprises three nondirectional aerials located at the apexes of a triangle, preferably equilateral, which receive the transient radiofrequency signal radiated from the explosion. These signals are fed to trigger circuits and coincidence gates which determine which of the three aerials were first and second to receive the transient. The time interval between these first and second arrivals is also measured. This interval gives the bearing of the explosion relative to the line joining the first and second arrival aerials.

NUCLEAR EXPLOSION DIRECTION INDICATOR

BACKGROUND OF THE INVENTION

This invention relates to apparatus suitable for determining the direction of a nuclear explosion occurring at or above ground level. By using two of the present apparatus, the location of the explosion can be obtained by cross bearings. It can also be used for determining the location of other large sources of radiofrequency transients, such as lightning storms.

In the specification of our copending application Ser. No. 633,568 filed Apr. 25, 1967, there is described apparatus for determining the occurrence of a nuclear explosion, as distinguished from naturally occurring phenomena such as lightning, and for estimating its yield. The apparatus therein described makes use of the transient radiofrequency and optical signals radiated from a nuclear explosion. The present invention makes use of the transient radiofrequency signal only.

SUMMARY OF THE INVENTION N

According to the present invention apparatus suitable for measuring the direction of a nuclear explosion comprises three nondirectional aerials for receiving the radiofrequency transient signal radiated from a said explosion, said three aerials being located at the apexes of a horizontal triangle, trigger circuit means triggerable by signals derived from the first and second of said aerials to receive said transient signal, gate means connected to determine which two aerials of the three are respectively the first and aerials to receive said transient signal, and means for determining the time interval between the receipt of said transient signal by said first and second aerials. Preferably the triangle is equilateral.

In one form the present invention provides apparatus for measuring the direction of a nuclear explosion comprising three nondirectional aerials for receiving the radiofrequency transient signal radiated from a said explosion, said three aerials being located at the apexes of a horizontal triangle, a first trigger circuit triggerable by a signal derived from any of said three aerials, a priming connection from said first trigger circuit to a second trigger circuit, said second trigger circuit being triggerable by a signal derived from any of said three aerials only after a priming signal is received from said first trigger circuit, means for measuring the time interval between the triggering of said first and second trigger circuits, first and second coincidence gates associated with each aerial, each first gate having one input connected to the output of said first trigger circuit and another input connected to the signal derived from one said aerial, and each second gate having one input connected to the output of said second trigger circuit and another input connected to the signal derived from said one aerial, and means associated with each gate for indicating the occurrence of a coincidence at said gate.

DESCRIPTION OF THE DRAWINGS

To enable the nature of the present invention to be more readily understood, attention is directed, by way of example, to the accompanying drawings, wherein.

DESCRIPTION OF THE PREFERRED EMBODIMENT

Figure 1:
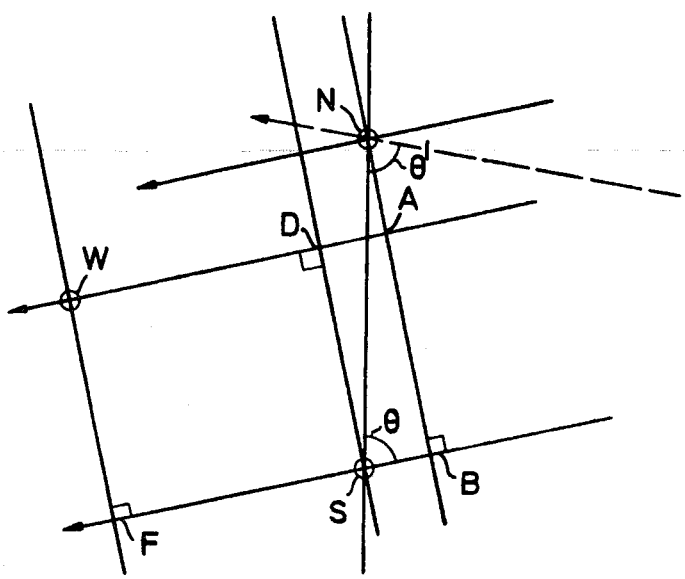
FIG. 1 is a diagram illustrating how the bearing of a radiofrequency signal can be derived from three aerials located at the apexes of an equilateral triangle.

Referring to FIG. 1, the circles N, S and W represent three aerials located at the apexes of an equilateral triangle. The bearing or direction of propagation of an oncoming radiofrequency transient wave front is indicated by the parallel arrows passing through these circles. The source of the transient is assumed sufficiently distant to render the signal received at the aerials a substantially plane wave.

The plane wave front NAB reaches aerial N at time $t_0$, aerial S at time $t_1$ and aerial W at time $t_2$. DS and WF represent the line of the wave front at times $t_1$ and $t_2$ respectively.

The time taken for the wave front to travel between aerials N and S is $t_1-t_0=BS/c$ sec. where $c$ is the velocity of propagation.

Similarly $t_2-t_1=DW/c$ sec.

If the bearing of the signal is defined as the angle $\theta$ between the direction of propagation and the line joining aerials N and S, then $BS=NS\cos\theta$ Hence $t_1-t_0=NS\cos\theta/c$ $$\text{and } \theta=\cos^{-1}\frac{(t_1-t_0)c}{NS}$$

The term $c/NS$ is a constant for a given aerial layout. If the distance NS is conveniently made 300 meters this term = $10^6$ sec.$^{-1}$, and $\theta$ is obtained from the value of $t_1-t_0$ in microseconds by using a set of cosine tables.

The maximum value of $t_1-t_0$ is 1 microsecond, obtained when the direction of propagation is along the line NS, i.e., $\theta=0$.

The value of $\theta$ relative to a line joining the pair of aerials which are first and second to receive the transient wave front is never less than 30°, although it may be less than 30° relative to a line joining another pair of the aerials. At this angle an overall timing error of ±18 nanosec. in the apparatus represents a bearing error ± 2°; at angles greater than 30° this timing error represents a progressively smaller error in the bearing angle.

If aerial S receives the wave front before aerial N but with the same time interval as derived above, the bearing is $\theta^1$ in FIG. 1, where $\theta^1=\theta$. Thus the order in which the wave front is received indicates the sense of the bearing angle relative to the line joining the two aerials.

The triangle need not be equilateral, but if a nonequilateral triangular spacing is used, the calculation of the bearing must be revised to suit the geometry. Similarly, the distance between aerials need not be 300 m. With shorter distances the timing accuracy required of the apparatus is correspondingly increased and vice versa, but with very large distances other errors may become significant, e.g., the signals received by the three aerials from a given transient may be dissimilar.

The term "horizontal" is used herein in a sense familiar in the aerial art to distinguish the present arrangement from a vertical array, but is not intended to limit it to aerials located in exactly the same horizontal plane. For example the three aerials can be located on sloping or irregular ground.

For distant explosions it is reasonable to assume that the bearing lies on a line intersecting the line joining the two relevant aerials. This assumption does not hold for near explosions owing to the hyperbolic shape of the curve for equal timing difference between two aerials. At near distances from the aerials, this curve deviates from the assumed straight line and passes between the aerials in such a way as to be closer to one than to the other. However the error introduced is not significant for ranges greater than 1 km.

The present apparatus detects which are the first and second of the three aerials to be reached by the wave front, and the time taken for it to travel between them, e.g., it detects N and S in FIG. 1 to the exclusion of W, indicates that N was reached before S, and measures $t_1-t_0$, thus enabling the bearing to be determined.

Figure 2A:
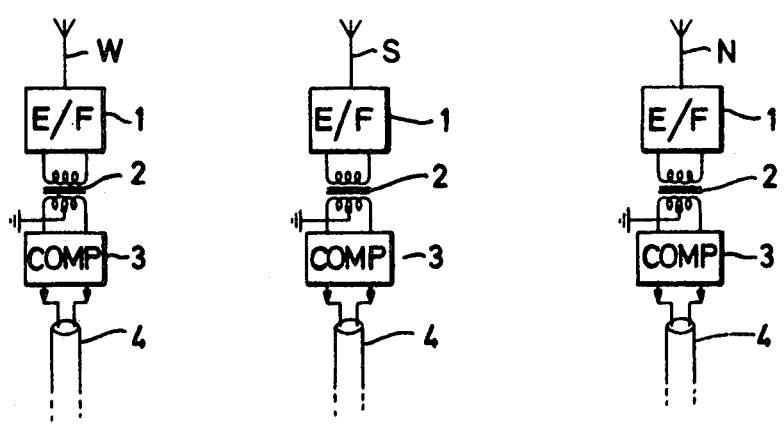
FIGS. 2(a) and 2(b) together constitute a block schematic diagram of apparatus embodying the present invention.
Figure 2B:
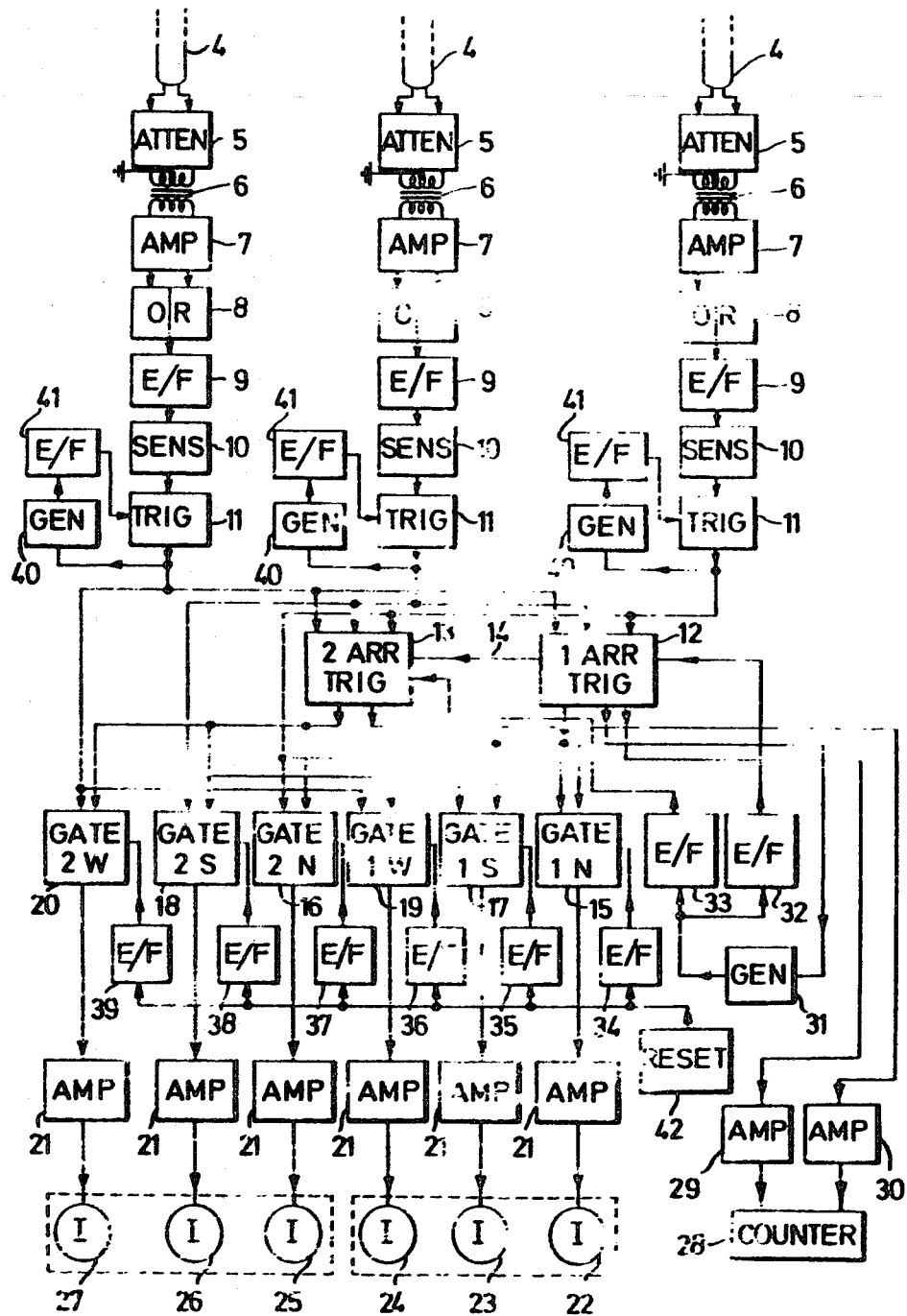

Referring to FIGS. 2(a) and 2(b), the principle of operation will first be described, and some of the preferred circuits employed described thereafter. The three aerials N, S and W are vertical 1 meter rods mounted 300 meters apart. Each aerial is mounted on a unit comprising an emitter-follower 1 whose output is matched by a transformer 2 via a cable compensator 3 to a twin coaxial cable 4. The three cables 4 are of equal electrical length, and are terminated via attenuators 5 by matching transformers 6 feeding balanced amplifiers 7. As the transient input signal may be of either polarity, the twin outputs from each amplifier 7 are fed to twin OR circuits 8 from which a positive output is obtained whatever the polarity of the transient.

Each OR output is fed via an emitter-follower 9 and a sensitivity-control circuit 10 to a trigger circuit 11 which is set by means of control circuit 10 to trigger if the transient exceeds a common predetermined level (±3 v./meter). The output pulse from each trigger circuit 11 is fed to a first-arrival trigger circuit 12 and to a second-arrival trigger circuit 13.

Trigger circuit 12 thus triggers if the field-strength at any aerial exceeds a predetermined level. Trigger circuit 13 is also triggered by such an input, but only if it has first been primed into a triggerable state by the prior triggering of trigger circuit 12. This priming action is effected via connection 14.

Associated with each aerial are two coincidence gates, viz gates 15 and 16 with aerial N, gates 17 and 18 with aerial S and gates 19 and 20 with aerial W. Gates 15, 17 and 19 each have one input connected to the output of trigger circuit 12 and the other input connected to the output of the associated trigger circuit 11. Gates 16, 18 and 20 each have one input connected to the output of trigger circuit 13 and the other input connected to the output of the associated trigger circuit 11. The output of each gate is connected via individual amplifiers 21 to indicator lamps 22–27.

Consider now a wave front arriving at the aerials, and let it be assumed that the front reaches aerial N first and aerial S second, as in FIG. 1, and that the field strength exceeds ±3 v./meter. Trigger circuit 12 is triggered by a pulse from the trigger circuit 11 associated with aerial N, and trigger circuit 13 is primed via connection 14. Thus when the wave front reaches aerial S, trigger circuit 13 is triggered by the pulse from the trigger circuit 11 associated with aerial S. Note that trigger circuit 13 was not triggered by the signal from aerial N because it was not primed, and that trigger circuit 12 is not retriggered because it remains in the state to which it was triggered by the signal from aerial N. Similarly, circuits 12 and 13 are not retriggered by the later signal from aerial W.

The pulse from the trigger circuit 11 associated with aerial N is also fed to the coincidence gates 15 and 16, and the outputs from trigger circuits 12 and 13 are fed to these gates respectively. Hence coincident pulses arrive at gate 15 but not at gate 16, and indicator 22 shows that the "first arrival" was at aerial N. Similarly, coincident pulses arrive subsequently at gate 18, but not at gate 17, from aerial S and trigger circuit 13, and indicator 26 shows that the "second arrival" was at aerial S. Thus indicators 22–24 show the "first arrival" aerial, and indicators 25–27 show the "second arrival" aerial. To compensate for the delay in the signal paths introduced by trigger circuits 12 and 13, the coaxial cables connecting the trigger circuits 11 to the coincidence gates 15–20 are made of sufficient length to introduce a compensating delay.

The time interval between arrival of the wave front at aerials N and S is measured by a counter 28 which counts the output pulses of an incorporated oscillator in a familiar manner. The counter is triggered into operation by the output pulse from trigger circuit 12 via amplifier 29 and the count is stopped by the output pulse from trigger circuit 13 via amplifier 30.

As the trigger circuits 11, 12 and 13 are bistable circuits in the above-described embodiment, they require to be reset to their initial states after each received transient. Resetting is effected by the trailing edges of pulses produced by pulse generators 40 and 31, triggered respectively by the output pulses from trigger circuits 11 and 12, these edges being fed back to trigger circuits 12 and 13 via emitter-followers 32 and 33 respectively, and to trigger circuits 11 via emitter-followers 41. The gates 15–20 are also bistable circuits, and are reset manually by a pulse generated in reset circuit 42 which is fed to the gates via emitter-followers 34–39.

In a modified form of the embodiment the resetting of all circuits is done automatically, as for trigger circuits 11, 12 and 13, but the resetting pulses are gated by a signal from a detection apparatus of the kind described in copending application Ser. No. 633,568, filed Apr. 25, 1967 so that the resetting action is inhibited when the latter detects the occurrence of a nuclear explosion. In this manner the present apparatus is rapidly reset after recording the large number of transients due to nonnuclear events such as lightning, but retains the indication of a transient due to a nuclear explosion. Printout and other such facilities can be added in a conventional manner.

Although circuits suitable for use in the above-described embodiment will be apparent to those skilled in the electronic art, data on the preferred circuits used will now be given.

The aerials N, S, W, are vertical 1-meter rods mounted on 20-foot masts, each having a 1meter square ground plane. Each emitter-follower 1 comprises two emitter-follower circuits connected in series. The input signal from each aerial is attenuated by a capacitive divider formed by the 18 pf. self-capacitance of the aerial and a 220 pf. capacitor connected to ground, giving an attenuation of 12.25:1. The output transformer 2 has a stepdown ratio of 6:1 to match the cable 4, which has an impedance across the inner conductors of 82.2 ohms. The balanced cable compensator 3 is of conventional form, and corrects for high frequency cable loss by increasing the low frequency attenuation. It gives a total attenuation with the cable of 6 db. over the frequency range 10 kc./s. to 3 mc./s. A series RC circuit across the input provides additional pulse shaping.

The resistive variable attenuator 5 is provided to equalize the effective aerial sensitivities when the apparatus is installed in its location.

Transformer 6 has a step-up ratio of 1:6. The balanced amplifier 7 is a transistor long-tailed pair having a gain of 40, and the OR circuit 8 comprises two similarly poled diodes connected to the two collectors of the amplifier, giving a positive output whatever the transient polarity. The sensitivity control 10 comprises a resistance which is variable stepwise, plus a continuous fine variation, connected in series with a tunnel diode biassed to the low-voltage state, the latter forming the bistable element of trigger circuit 11. The sensitivity control is preset to trigger the tunnel diode to its high-voltage state if the transient radiofrequency signal strength at the aerial exceeds ± 3v./meter. Pulse generator 40 is a monostable circuit (flip-flop) producing a 1 ms. output pulse whose differentiated negative trailing edge resets the tunnel diode to its quiescent low-voltage state via emitter-follower 41 as already described.

A clamping diode is connected to limit the voltage across the tunnel diode to 0.5 v. should the input signal from the amplifier exceed this level, in order to prevent signal breakthrough interfering with the subsequent trigger circuits.

The positive-going voltage step developed across each tunnel diode is differentiated and fed via four 75-ohm cables to the two arrival trigger circuits 12 and 13 and to its associated gates 15–20. The differentiating capacitor is at the input end of each cable. The differentiated pulses at the output ends have an amplitude greater than 100 mv., with a midpulse width of 10 ns. The cables to the arrival trigger circuits 12 and 13 are about 2 meters long and those to the gates 15–20 1-meter longer, to provide the aforementioned compensating delay.

In the first-arrival trigger circuit 12, the bistable element is again a tunnel diode biassed to the low-voltage state. The three inputs from the trigger circuits 11 are each fed to the tunnel diode through separate backward diodes. The bias on the tunnel diode is such that it is triggered to the high-voltage state by a pulse of about 140 mv., with a midpulse width of 10 ns.

In the second-arrival trigger circuit 13 the bistable element is also a tunnel diode biassed to the low-voltage state, but the bias current is made sufficiently lower than that in trigger circuit 12 to prevent it being triggered by the pulses from trigger circuits 11 acting alone. However a backward diode in series with a resistor is connected between the tunnel diode of circuit 12 and that of 13 so that when the former is triggered to the high-voltage state, the current through the latter is increased from its bias level to a level at which a subsequent pulse from a trigger circuit 11 can trigger it to the high voltage state. This resistor and backward diode constitute the aforementioned priming connection. Both tunnel diodes are reset to the low-voltage state by the differentiated trailing edge of the 1 ms. monostable pulse generator (flip-flop) 31.

The gates 15–20 each include a tunnel diode biassed in the low-voltage state, to which differentiated 10 ns. wide pulses are fed from one of the trigger circuits 11 through one backward diode, and from trigger circuit 12 or 13 through another backward diode. The bias current is made low enough to ensure that the tunnel diode can only be triggered to the high voltage state by the simultaneous receipt of pulses from a circuit 11 and from circuit 12 and 13; a pulse from only one of those sources will not do so.

A manual reset circuit 42 comprises a pushbutton switch which discharges a capacitor through an emitter-follower to generate a negative resetting pulse which is fed to the tunnel diodes via emitter-followers 34–39. This reset circuit can also be connected to reset trigger circuits 12 and 13 manually if desired.

The amplifiers 29 and 30 each comprise a transistor cascode first stage and an avalanche transistor output stage. The input pulse is 200 mv., and the output is 10–12 v., rising to the first 5 v. in less than 5 ns. This fast rise-time is required to give good timing accuracy with the counter 28, which is a Hewlett-Packard Type 5275A requiring 3 v switching pulses with a rise-time of 6 ns.

The amplifiers 21 are simple two-stage transistor DC amplifiers having lamps 22–27 in series with the second collector.

We claim:

1. Apparatus suitable for measuring the direction of a nuclear explosion occurring within a range of interest from a measuring site comprising three nondirectional aerials located at said site for receiving the radiofrequency transient signal radiated from a said explosion, said three aerials being located at the apexes of a horizontal triangle, the spacing between said three aerials being no greater, in relation to said range of interest, than will cause all three aerials to intercept a substantially plane wave front of said radiated transient signal, trigger circuit means triggerable by signals derived from the first and second of said aerials to intercept said plane wave front, gate means connected for determining which two aerials of the three are respectively the first and second aerials to intercept said plane wave front, and means for determining the time interval between the interception of said plane wave front by said first and second aerials.

2. Apparatus as claimed in claim 1 wherein the triangle is equilateral.

3. Apparatus as claimed in claim 1 comprising a first trigger circuit triggerable by a signal derived from any of said three aerials, a priming connection from said first trigger circuit to a second trigger circuit, said second trigger circuit being triggerable by a signal derived from any of said three aerials only after a priming signal is received from said first trigger circuit, means for measuring the time interval between the triggering of said first and second trigger circuits, first and second coincidence gates associated with each aerial, each first gate having one input connected to the output of said first trigger circuit and another input connected to the signal derived from one said aerial, and each second gate having one input connected to the output of said second trigger circuit and another input connected to the signal derived from said one aerial, and means associated with each gate for indicating the occurrence of a coincidence at said gate.

4. Apparatus as claimed in claim 3 wherein said first and second trigger circuits are bistable circuits and comprising pulse generator means for automatically resetting said trigger circuits to an initial state.

5. Apparatus as claimed in claim 4 wherein said first and second trigger circuits each comprises a tunnel diode initially biassed to one of two states, the diode of said second trigger circuit being biassed further into its initial state than the diode of said first trigger circuit, said priming connection being connected to feed current to said diode of said second trigger circuit in a sense to reduce the bias on said diode when said first trigger circuit is triggered from its initial state.

6. Apparatus as claimed in claim 3 wherein said coincidence gates are bistable circuits and comprising pulse generator means for resetting said gates to an initial state.

7. Apparatus as claimed in claim 6 wherein each said coincidence gate comprises a tunnel diode.

8. Apparatus suitable for measuring the direction of a nuclear explosion occurring with a range of interest from a measuring site comprising three nondirectional aerials located at said site for receiving the radiofrequency transient signal radiated from a said explosion, said three aerials being located at the apexes of a horizontal triangle, the spacing between said three aerials being no greater, in relationship to said range of interest, than will cause all three aerials to intercept a substantially plane wave front of said radiated transient, circuit means operable by signals derived from said aerials for determining the order in which said aerials intercept said plane wave front, and means for determining the time interval between the interception of said plane wave front by a known pair of said aerials.